United States Patent
Bandi et al.

(10) Patent No.: US 11,399,013 B2
(45) Date of Patent: Jul. 26, 2022

(54) SECURE SERVICE MESH

(71) Applicant: Fortanix, Inc., Mountain View, CA (US)

(72) Inventors: Nehal Bandi, San Jose, CA (US); Anand Kashyap, Los Altos, CA (US)

(73) Assignee: Fortanix, Inc., Mountain View, CA (US)

( * ) Notice: Subject to any disclaimer, the term of this patent is extended or adjusted under 35 U.S.C. 154(b) by 255 days.

(21) Appl. No.: 16/853,590

(22) Filed: Apr. 20, 2020

(65) Prior Publication Data

US 2021/0328971 A1    Oct. 21, 2021

(51) Int. Cl.
*H04L 9/40* (2022.01)
*H04L 101/663* (2022.01)
*G06F 21/53* (2013.01)
*G06F 21/57* (2013.01)

(52) U.S. Cl.
CPC .......... *H04L 63/0281* (2013.01); *G06F 21/53* (2013.01); *G06F 21/57* (2013.01); *H04L 61/6063* (2013.01); *H04L 63/0428* (2013.01); *H04L 63/08* (2013.01)

(58) Field of Classification Search
CPC ............. H04L 63/0281; H04L 61/6063; H04L 63/0428; H04L 63/08; G06F 21/53; G06F 21/57
See application file for complete search history.

(56) References Cited

U.S. PATENT DOCUMENTS 10,764,244 B1 *  9/2020  Mestery .............. G06F 9/45558
2020/0358802 A1 * 11/2020  Viswambharan ..... H04L 63/105

* cited by examiner

*Primary Examiner* — Duc C Ho
(74) *Attorney, Agent, or Firm* — Lowenstein Sandler LLP (57) ABSTRACT

A request to perform an operation associated with a service instance may be received by a processing device. The service instance may have an associated service instance identifier. A proxy instance associated with the service instance may be identified. The proxy instance may perform operations within a secure enclave associated with the processing device. The proxy instance within the secure enclave associated with the processing device may be used to verify that the secure enclave associated with the processing device contains the service instance associated with the service instance identifier. When the verification is successful, the proxy instance within the secure enclave associated with the processing device may be used to send a request to the service instance to perform the operation.

20 Claims, 8 Drawing Sheets

SECURE SERVICE MESH

TECHNICAL FIELD

Aspects of the present disclosure relate generally to security, and more specifically, relate to securing service meshes.

BACKGROUND

A service mesh may provide infrastructure services, such as load balancing and failure recovery, to an application that is structured as a set of components that interact with network services. The network services may be microservices that provide application features in a loosely-coupled networked architecture. The service mesh may include a set of network proxies that intercept communication to and from the network services and add the infrastructure services. For example, there may be a network proxy instance for each microservice. The network proxies are ordinarily located near one side of their corresponding microservices in the network topology, and are thus referred to as "sidecars." The service mesh architecture enables separation of infrastructure services from the application, thereby simplifying the application.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure relate to secure execution and identification of services in service mesh architectures. In general, applications can be implemented using services that the applications invoke to perform specified operations, and the services can be executed securely using secure enclaves. Secure enclaves use hardware-based operations to verify the identity of services, and to detect changes to the service code or data that may indicate the service has been modified or impersonated by other code that does not perform the specified operations or performs additional operations. Services may be identified by names or other identifiers, and applications or other services may use the identifiers to access the services. Applications and other services rely on the services to perform the operations associated with their identifiers. Thus, changing the code or data that implements a service may have the effect of changing the service's identity, thereby compromising the integrity of the service. Since unauthorized changes to a service's code or data are unlikely to change the service's name or other identifying information (e.g., IP address or embedded tags), applications may continue using compromised services, potentially resulting in a range of problems such as incorrect results, unauthorized access of confidential information without proper authorization, data loss, and so on. Since service identity is ordinarily determined by software, e.g., based on information such as metadata that identifies a server's network address and location, unauthorized changes to the software can result in incorrect identities. Access control roles based on static identity information such as host identifiers, network addresses, cluster identifiers, or other metadata may be forged by copying or otherwise impermissibly obtaining the static identity information. If static identity information is based on the compute node's host, network, and cluster identifiers, then services having different privileges and running under computing environments that appear identical (based on their host, network, and cluster identifiers) can bypass access controls. For example, an access control rule may specify that a service having an identity A can communicate with another service having an identity B. However, if another service C can change its identity to A, then service C can effectively bypass the rule and communicate with service B, potentially obtaining unauthorized access to confidential information from service B, or performing other unauthorized operations. As another example, if a compromised service provides incorrect status information, then visibility into the utilization of cluster resources may be lost, resulting in an inability to properly manage cluster resources.

Aspects of the present disclosure address the above and other deficiencies by providing verification techniques that can detect such unauthorized changes and take appropriate action, such as stopping execution of or disabling access to the compromised service.

In particular embodiments, the identity of a service in a service mesh can be securely verified by executing the service in a secure enclave and performing verification protocols associated with the enclave. The verification protocols may be performed by a sidecar proxy ("sidecar") associated with the service in the service mesh. Each service may be associated with a sidecar that intercepts operation requests sent to the service, performs sidecar operations related to infrastructure, such as fault-tolerance, application monitoring, and the like, and forwards the operation requests to the service, which performs the requested operation. The sidecar that performs identity verification is referred to herein as an identity sidecar. The verification of the service in the secure enclave may be performed by the identity sidecar executing in the secure enclave (or another secure enclave associated with the same processor). The verification may be performed when the service is started (e.g., when an instance of the service is created). Since the service executes within the secure enclave, unexpected modification of the service that changes the service's identity is difficult. Thus, performing verification when the service is started provides protection against unexpected modification of the service. However, there is still a possibility that the service's identity could be changed by unauthorized modifications. Since the service instance could potentially be modified at any time during its execution, the verification operations may be performed by the sidecar when the sidecar intercepts a request sent to the service, so that the service instance is verified prior to performing each requested operation, and unexpected modifications to the sidecar may be detected prior to performing each operation. Alternatively, the sidecar may perform the verification at other times, such as at periodic intervals.

Since the verification is performed by the identity sidecar instead of the service itself, the application (e.g., the service's implementation) need not be modified to use the service identity verification features. The verification may be performed by the identity sidecar when, for example, the secure enclave containing the service is created, or at other times, such as when particular service operations are invoked by an application. To perform the verification, the identity sidecar may execute a set of verification protocol operations, which may include local attestation to verify the contents of the secure enclave, remote attestation to verify the identity of the processor associated with the enclave, and verification that the service's name or identifier was associated with the processor at a previous time, e.g., when the service was started on the processor. If any of these verification steps fails, then the service's identity may have been compromised, and the service may be stopped. Further, the sidecar may stop processing requests for the service's identity until the service passes the verification (e.g., after being restarted).

Advantages of the present disclosure include, but are not limited to, the securely verifiable service identity that is verified by the sidecar for the service, so the service implementation may use the secure service verification features without modification of the service's implementation. The integrity of the service's code and data may be maintained by the secure enclave in which the service code and data are stored. The service's code and data are stored in encrypted form in the secure enclave, so the code and data are not readable by processes executing outside the enclave. As a result, the security, integrity, and validity of service code and data executing in processors on servers of a service mesh may be ensured.

Figure 1:
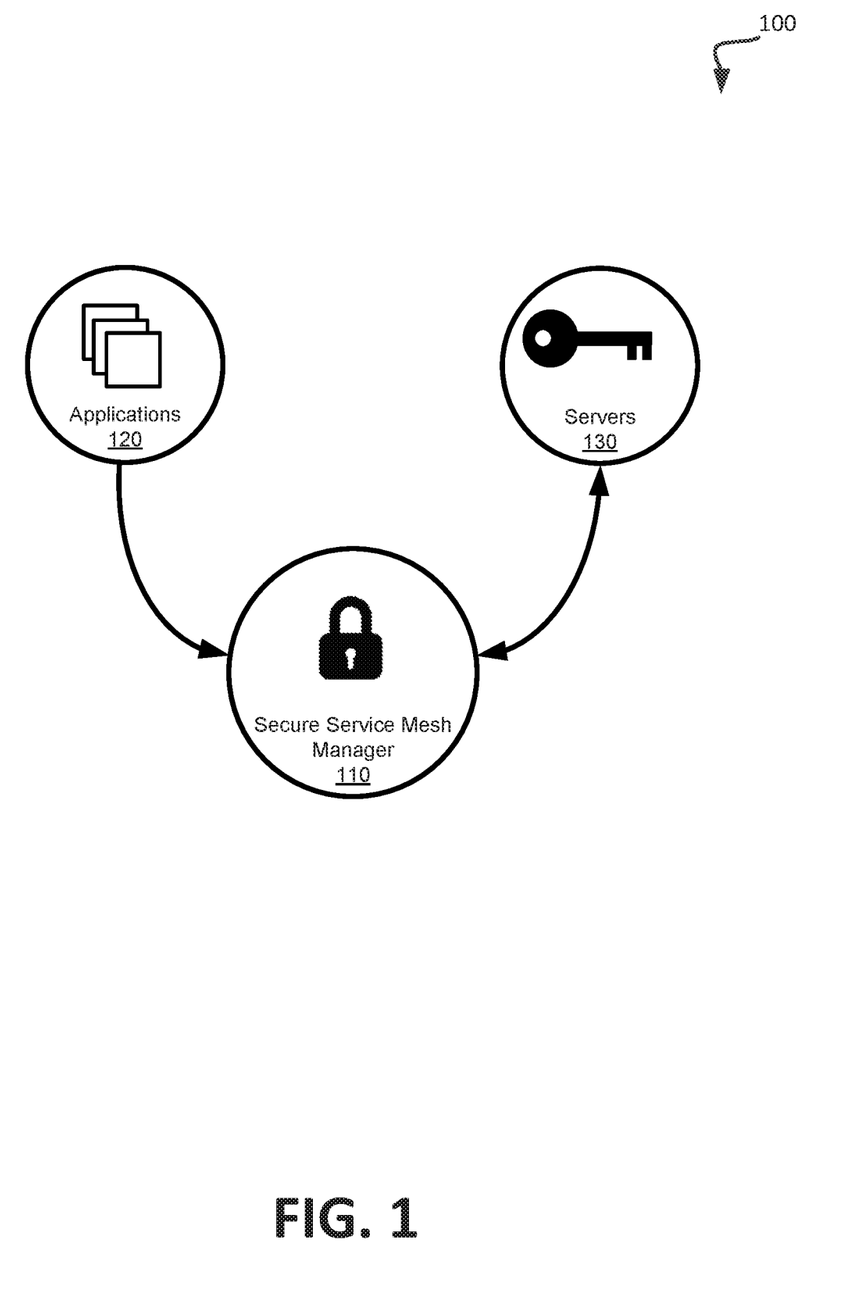
FIG. 1 illustrates an example environment to provide a secure service mesh in accordance with particular embodiments of the present disclosure.

FIG. 1 illustrates an example environment 100 to provide a secure service mesh, in accordance with some implementations of the disclosure. The environment 100 may correspond to a network cluster that includes nodes 110 and 120 that are part of the network cluster in which a secure service mesh is managed by a secure service mesh manager 110.

As shown in FIG. 1, the environment 100 may correspond to a network cluster (i.e. a secure cluster) that includes nodes 110 and 120. Although two nodes are shown as being part of the network cluster, any number of nodes may be included in the network cluster. Each of the nodes 110 and 120 may correspond to a service provided by a secure service mesh. As described in more detail below with regards to FIG. 2, each service that is represented by a node may be assigned or designated to a secure enclave by a processing device so that code and data of the service may not be read from or written to except by the secure enclave. The code of the service may include the computer program instructions that implement the service. The data of the service may include data stored in the enclave in association with the service, such as encryption keys. A secure enclave refers to a private region of memory that is associated with a processor and stores information, including program code and data, that cannot be accessed by program code executed by the processor from memory locations outside the enclave. The program code and data are stored in the enclave in an encrypted form that can only be decrypted by the processor using a decryption key, which is also known only to the processor. The processor only decrypts the information in the enclave when the information is accessed by code running within the enclave. Thus the information stored in the secure enclave is inaccessible to applications and the operating system executed by the processor unless the code in the enclave specifically sends the information out of the enclave. The nodes 110 and 120 may determine an identity of a service based on the data and may subsequently provide the identity to an application or other service as described with regards to FIG. 2.

Figure 2:
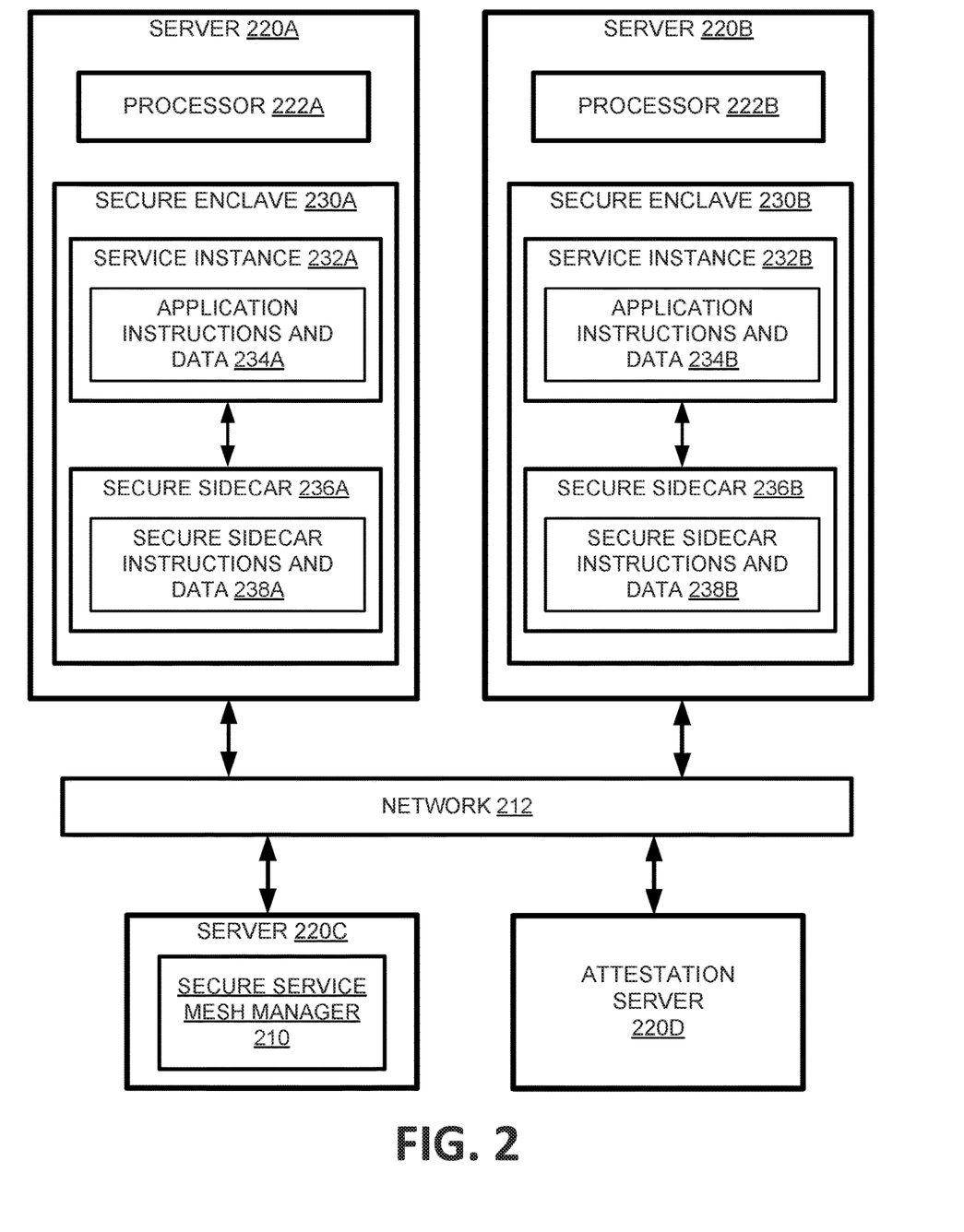
FIG. 2 illustrates example network servers with a secure service mesh to provide secure execution of services in accordance with particular embodiments of the present disclosure.

FIG. 2 illustrates example network servers 220 with a secure service mesh to provide secure execution of services in accordance with particular embodiments of the present disclosure. In general, the servers 220 communicate via a network 212 and correspond to the nodes 120, 130 of FIG. 1. A server 220C hosts a secure service manager 210 that corresponds to the secure service manager 110 of FIG. 1.

As shown in FIG. 2, each of the two network servers 222A,B may include respective processors 222A,B, and secure enclaves 230A,B associated with the processors. A service instance 232A,B and a secure sidecar 236A,B may be stored securely in and may execute securely in each secure enclave 230A,B. Each service instance 232A,B may be an instance of a service, such as a banking service named "Banking Service" for instance 232A and "Delivery Service" for instance 232B Each service instance 232A,B may have a service instance identifier, such as "Banking Service: 1" for service instance 232A and "Delivery Service:1" for service instance 232B. Each service instance 232A,B may be implemented by application instructions and data 234A, B. Each secure sidecar 236A,B may be implemented by secure sidecar instructions and data 238A,B. A service may be understood as a discrete unit of functionality that can be accessed remotely and may provide operations that can be invoked. A service instance may be, for example, an executable process or thread that provides the service and implements the service's operations. There may be multiple service instances (e.g., replicas) for a service. Each service instance may be associated with a network proxy referred to herein as a sidecar. Services may communicate with each other to implement an application. Each service may be associated with a service identifier, e.g., "Bank Service." Each service instance may be associated with an identifier as well, e.g., "Bank Service:1" and "Bank Service:2" may be identifiers for two instances of "Bank Service." Similarly, sidecars may be associated with sidecar identifiers, e.g., "Identity Sidecar." Each secure sidecar may be understood as a sidecar instance, and may be associated with an identifier, e.g., "Identity Sidecar:1" and "Identity Sidecar:2" for two instances of "Identity Sidecar." A microservice may be a fine-grained service that may represent a smaller unit of functionality than a service. For example, on average, individual microservices may provide fewer operations than services.

Communication between service instances 232, such as requests and responses, located on different servers 220 may be sent via the network 212. The service instance 232A may send requests to other service instances, such as instance 232B, to perform operations. The requests may be intercepted by secure sidecars such as secure sidecar 236A, which may perform infrastructure operations (e.g., load balancing, failure detection, monitoring, service discovery, and the like) and forward the requests to the destination services (e.g., instance 232B). Requests sent between different servers 220 may be sent via the network 212. The requests sent to the destination service 232B may be intercepted by secure sidecar 236B on server 220B, which may perform infrastructure operations and forward the request to the service instance 232B. The service instance 232B may perform an operation, e.g., requesting delivery of a package to an address, and send a result, e.g., a status indicator, to be sent back to the invoking service 232A.

Results of operations performed by services may be returned in a reverse path, e.g., from instance 232B to secure sidecar 236B, which may perform additional infrastructure operations, then via network 212 to secure sidecar 236A, which may perform infrastructure operations, and then to service instance 232A.

A server 220C may host a secure mesh manager 210, which may perform service management operations such as creating service instances 232 and secure sidecars 236. The secure mesh manager 210 may also perform operations related to verifying service instances 232, such as storing associations between processor identifiers and service instance identifiers, and verifying that particular processor identifiers are associated with particular service instance identifiers, as described below. An attestation server 220D may provide remote attestation services to securely verify the identity of each processor 222. In particular embodiments, the attestation server 220D may perform a portion of the remote attestation protocol in response to a request from a secure sidecar 236. For example, the attestation server 220D may send an attestation quote request to a third-party attestation server (not shown), which may perform attestation operations and send a quote response back to the attestation server 220D. The third-party attestation server, which may be separate from the attestation server 220D, may be provided by or associated with a third party such as the vendor or organization that provides the processors 222. For example, to perform remote attestation, the secure sidecar may send an attestation request to the attestation server 220D. The attestation request may include a quote credential (e.g., as specified by the third party's the attestation protocol). The attestation server 220D may verify the attestation request and send a quote to the third-party attestation server, which may verify the quote and send a response indicating whether the attestation based on the quote is successful (e.g., whether the quote is valid according to the third party). The attestation server 220D may receive and validate the quote response. If the quote response is successfully validated, the attestation server 220D may generate session keys, which may be used to establish secure communication between the secure sidecar and the attestation server 220D for exchanging subsequent information. If the attestation server 220D successfully validates the quote response, it may further send a response (e.g., to the secure sidecar) indicating that the secure enclave is trusted.

A secure sidecar 236 may verify that the service instance 232 corresponds to the processor on which it is located (e.g., executed) by sending a verification request to a verification service via a secure communication protocol. The secure service mesh manager 210 may provide the verification service. The secure sidecar may send the service instance identifier of the service instance 232 associated with the secure sidecar and the processor identifier of the processor on which the service instance and secure sidecar are located to the secure service mesh manager 210 on the server 220C (or alternatively, to another server, such as the attestation server 220D). The secure service mesh manager 210 may consult a whitelist of previously-established current associations between service instance identifiers and processors to determine whether the secure service identifier is legitimately associated with the processor identifier. The attestation server 220D may return a result indicating that the association is valid when the association is present in the whitelist or, alternatively, a result indicating that the association is invalid when the association is not present in the whitelist.

The secure sidecar 236 may send the service instance identifier and processor identifier to the attestation server 220D and receive the result from the attestation server 220D via a secure communication protocol. For example, the secure sidecar 236 may perform a secure communication protocol by encrypting the service instance identifier and processor identifier using a session key determined in the attestation process described above. The secure sidecar may send the encrypted identifiers to the secure service mesh manager 210 using a network connection (e.g., TCP/IP) or other form of network connection. The secure service mesh manager 210 may receive the encrypted identifiers and use a session key (determined in the attestation process described above) to decrypt the identifiers and search for them in the whitelist. The secure service mesh manager 210 may encrypt the result of the search and send the encrypted result (e.g., verification success or failure) as a verification response to the secure sidecar. Message authentication codes may be calculated for the encrypted identifiers and verification results and encrypted with the session keys to verify the validity of the encrypted data. Alternatively or additionally, the secure channel may be a Transport Layer Security (TLS) or Secure Sockets Layer (SSL) encrypted network connection, in which case the secure sidecar may simply send the service instance identifier and processor identifier via the encrypted network connection.

Figure 3A:
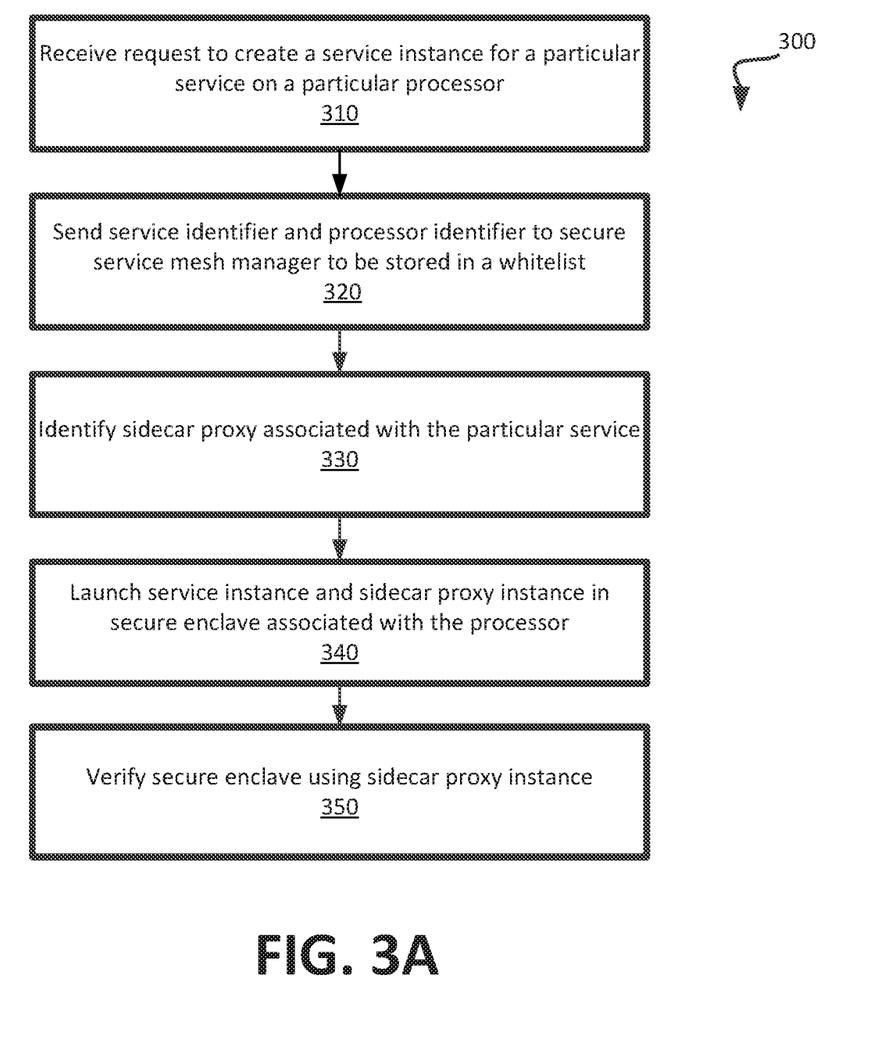
FIG. 3A is a flow diagram of an example method to create a secure service mesh in accordance with particular embodiments of the present disclosure.

FIG. 3A is a flow diagram of an example method 300 to create a secure service mesh in accordance with particular embodiments of the present disclosure. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the secure service manager 110 of FIG. 1 or the secure service manager 210 of FIG. 2.

As shown in FIG. 3, the method 300 may begin with the processing logic receiving a request to create a service instance 232 for a particular service on a particular physical processor on a machine (block 310). The processing logic may subsequently send a service identifier associated with the particular service and processor identifier associated with the processor to secure service mesh manager 210 to be stored in a whitelist (block 320). A whitelist may be created and maintained to represent the identities of valid services and the identities of physical processors with which the valid services are associated (and on which the associated services may be executed). The secure service mesh manager 210 may store an association between the received service identifier and the received processor identifier in a whitelist or other data structure for subsequent retrieval when requests to verify associations between particular service identifiers and processor identifiers are received. The processing logic may further identify a secure sidecar proxy ("sidecar") 236 associated with the particular service (block 330). The processing logic may further launch the service instance 232 and secure sidecar 236 in the secure enclave associated with the processor (block 340). To launch the service instance and secure sidecar, the processing logic may create the secure enclave, load an enclave image into the enclave and, if the instructions in the enclave loaded from the image are not already executing, begin execution of the instructions in the secure enclave. The enclave image may be, e.g., a file that contains the program code and data to be loaded into the enclave. The enclave image may include the program code and data for the secure sidecar 236 and for the service instance 232. If the service instance's identity (e.g., a service instance identifier) is included in the program code or data that implements the service instance, then the enclave image may include the service instance's identity, and the service instance's identity may be validated by the enclave validation techniques described herein.

Alternatively, the service instance 232 and secure sidecar 236 may be launched in different secure enclaves associated with the processor. If the service instance and secure sidecar are stored in different enclaves, there may be different enclave files for the secure sidecar and service instance, which may be loaded into the respective enclaves. The processing logic may further verify the secure enclave using the secure sidecar (block 350). The secure enclave(s) may be verified by program code operations initiated by a secure sidecar 236, or by the secure service manager 210, or a combination of both. An example method to verify the secure enclave is shown in FIG. 3B.

Figure 3B:
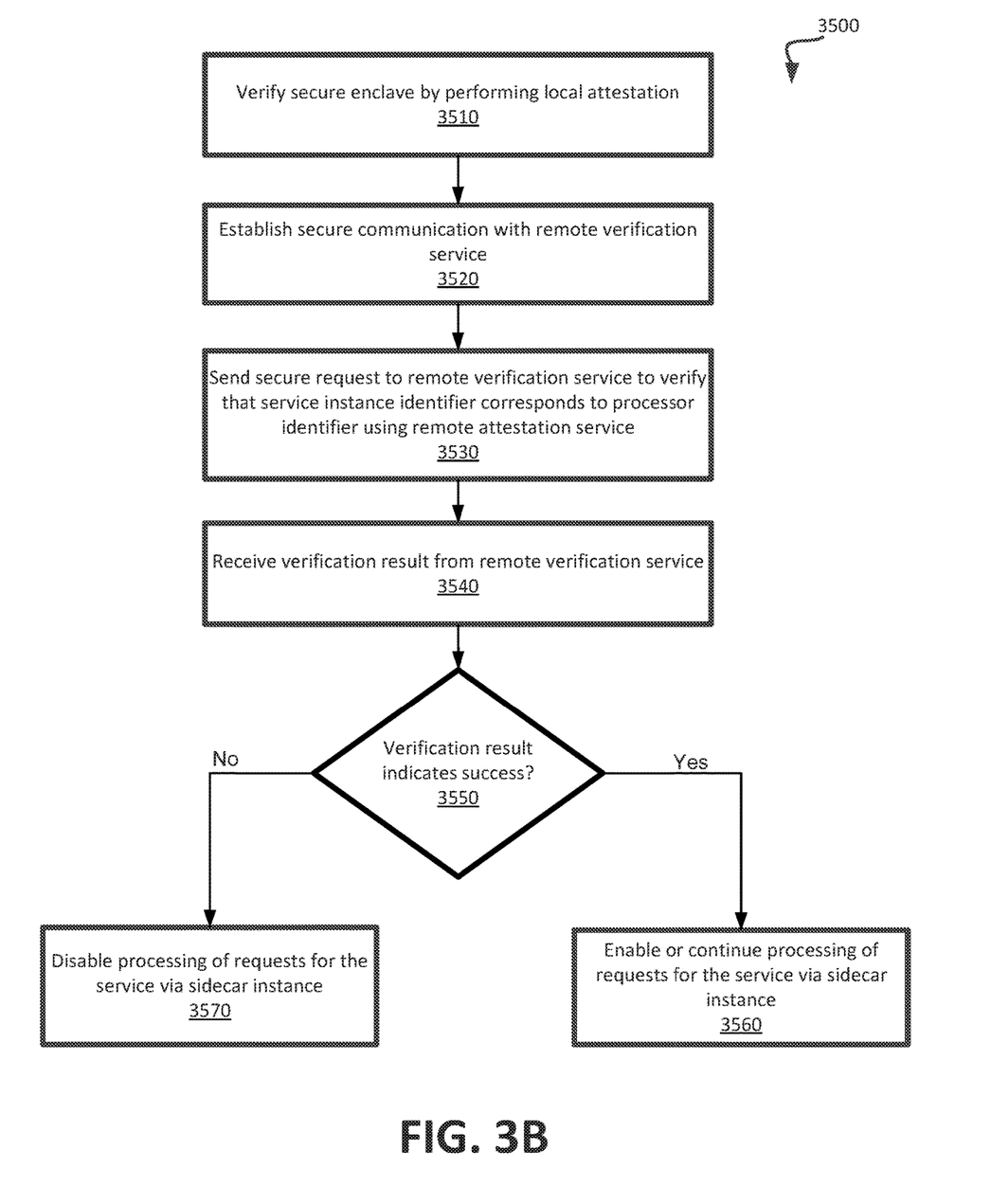
FIG. 3B is a flow diagram of an example method to verify a secure enclave of a service mesh in accordance with particular embodiments of the present disclosure.

FIG. 3B is a flow diagram of an example method 3500 to verify a secure enclave of a service mesh in accordance with particular embodiments of the present disclosure. In general, the method 3500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 3500 may be performed by the secure sidecar 236 or the secure service manager 210 of FIG. 2, e.g., as part of performing block 350 of FIG. 3A. Alternatively or additionally, the secure enclave verification method 3500 may be performed for each operation request (directed to the service instance 232) received by the secure sidecar 236, so that the service instance is verified prior to each operation it performs. In other embodiments, the verification method 3500 may be performed by the secure sidecar on the associated service instance at any other suitable time, e.g., at periodic intervals.

As shown in FIG. 3B, the method 3500 may begin with the processing logic by performing local attestation (block 3510). If the service instance 232 and secure sidecar 236 are stored in different enclaves, the processing logic may cause the enclaves to verify each other. The processing logic may subsequently establish secure communication with remote verification service (block 3520). The processing logic may further send a secure request to a remote verification service such as the secure service mesh manager 210 to verify that service instance identifier corresponds to processor identifier using remote attestation service (block 3530). The secure service mesh manager 210 may search its whitelist or other list of associations for the received service instance identifier and processor identifier. If an association between the received service instance identifier and processor identifier is present in the whitelist, then the secure service mesh manager 210 may return a verification result indicating that the service instance identifier is associated with the processor identifier. If the association is not found in the whitelist, then the secure service mesh manager 210 may return a verification result indicating that the service instance identifier is not associated with the processor identifier (e.g., the received service instance identifier is not the correct service instance identifier for the processor identifier).

The processing logic may further receive the verification result from remote verification service, e.g., from the secure service mesh manager 210 (block 3540). The processing logic may further determine whether the verification result indicates success (block 3550). If so, the processing logic may enable or continue processing of requests for the service via the secure sidecar 236, or otherwise allow the service instance 232 to receive and process requests (block 3560). If the verification result does not indicate success, then the processing logic may disable processing of requests for the service via the secure sidecar. For example, the secure sidecar, the service instance, or both may be stopped and/or deleted from memory.

Figure 4:
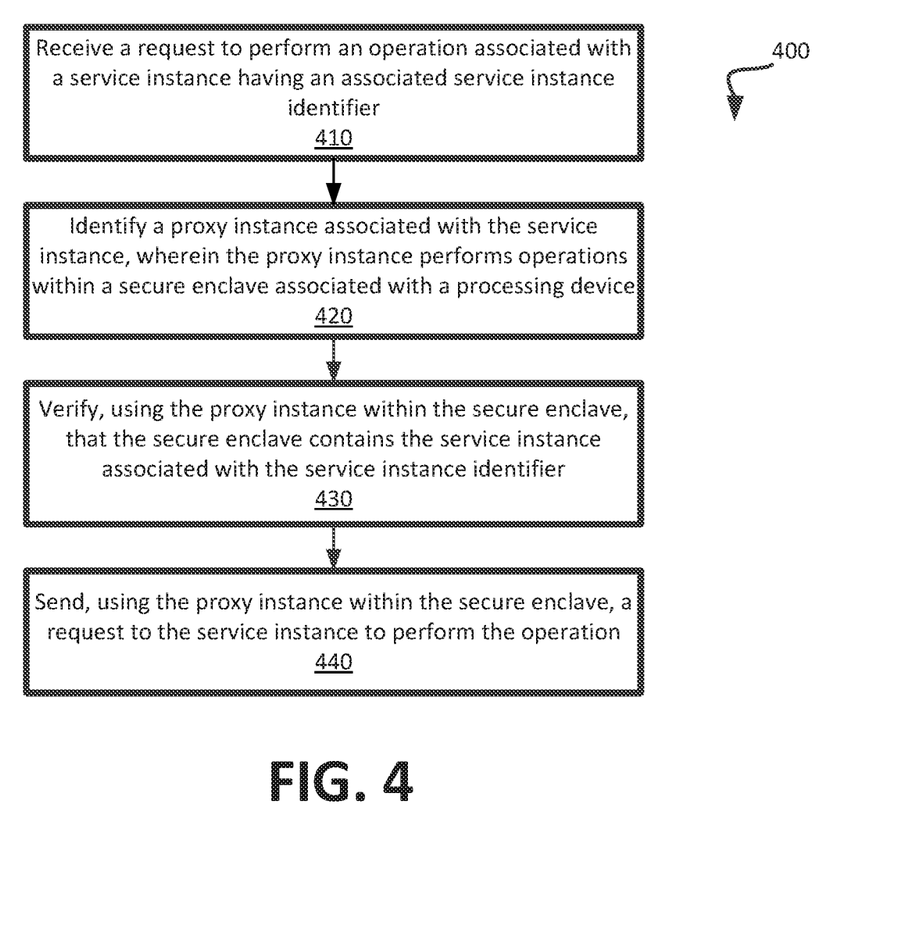
FIG. 4 illustrates an example method to process a request for a service to perform an operation in a secure service mesh in accordance with particular embodiments of the present disclosure.

FIG. 4 is a flow diagram of an example method 400 to process a request for a service to perform an operation in a secure service mesh in accordance with particular embodiments of the present disclosure. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, at least a portion of the method 400 may be performed by a secure sidecar 236. Alternatively or additionally, the method 400 may be performed by the secure service manager 210 of FIG. 2.

As shown in FIG. 4, the method 400 may begin with the processing logic receiving a request to perform an operation associated with a service instance 232 having an associated service instance identifier (block 410). The processing logic may subsequently identify a proxy instance (e.g., secure sidecar 236) associated with the service instance, wherein the proxy instance performs operations within a secure enclave associated with a processing device (block 420). The processing logic may further verify, using the proxy instance within the secure enclave, that the secure enclave contains the service instance associated with the service instance identifier (block 430). The processing logic may further send, using the proxy instance within the secure enclave, a request to the service instance to perform the operation (block 440).

Figure 5:
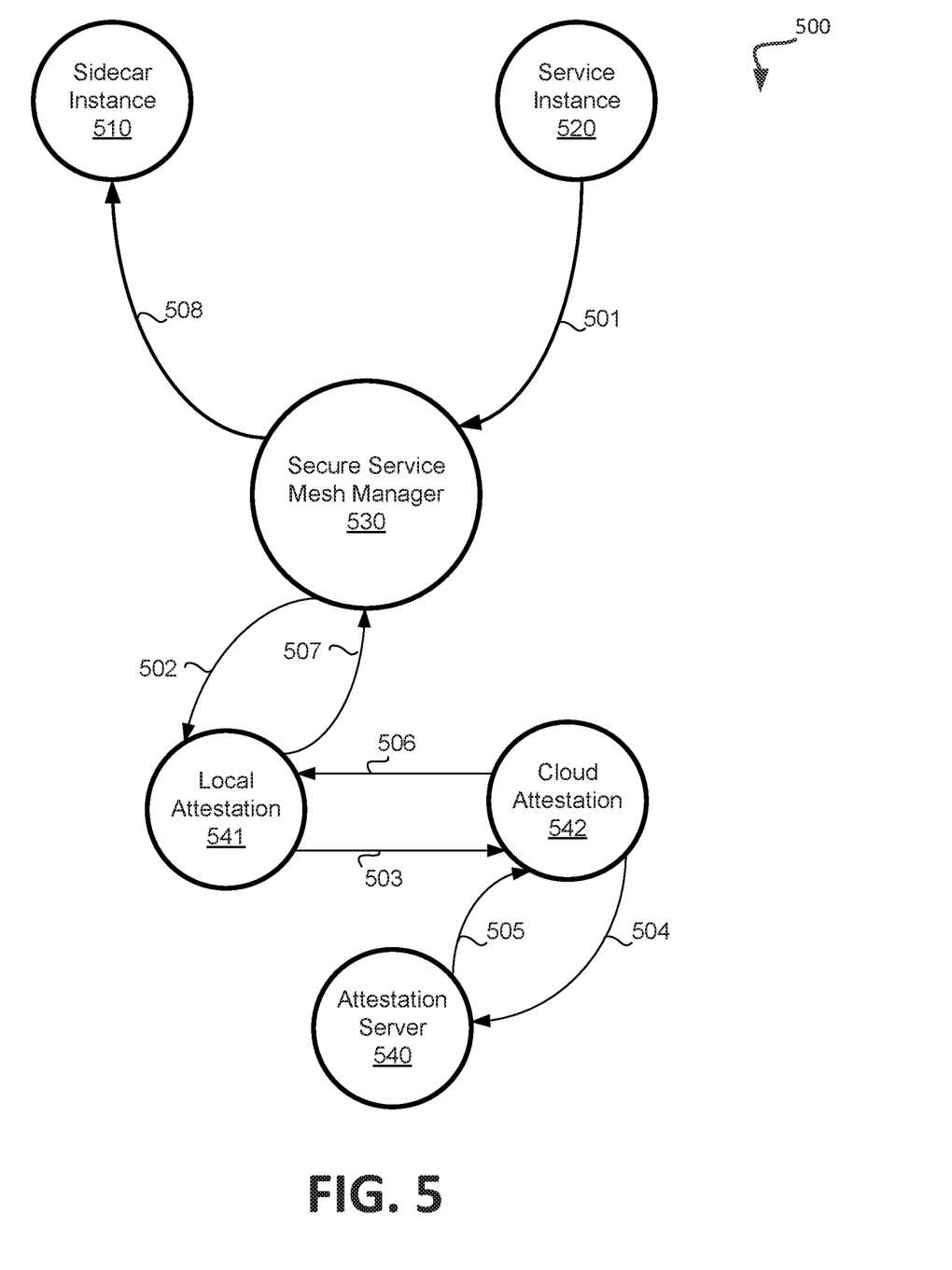
FIG. 5 is a flow diagram of an example environment to provide a secure service mesh by performing local attestation and remote attestation in accordance with particular embodiments of the present disclosure.

FIG. 5 is a flow diagram of an example environment 500 to provide a secure service mesh by performing local attestation and remote attestation in accordance with particular embodiments of the present disclosure. In general, the environment 500 may include a secure sidecar 510, a service instance 520, and a secure service mesh manager 530. The secure sidecar 510 may correspond to the node 130 of FIG. 1. The service instance 520 may correspond to the node 110 of FIG. 1. The secure service mesh manager 530 may correspond to the node 110 of FIG. 1.

As shown in FIG. 5, the environment 500 may include a secure sidecar 510 that is on a node in a network cluster, a service instance 520 that is to be verified using local and remote attestation protocols, a remote attestation server 540, a local attestation service 541, and a cloud attestation service 542. An attestation server 540 may correspond to the attestation server 220D of FIG. 2.

In operation, the service instance 520 may provide a message 501 to the administrator 530 to initiate a local attestation protocol. For example, the message 501 may include attestation data that is signed or based on a public key of the node on which the service instance 520 is executing. The attestation data may be based on one or more factors including, but not limited to, attestation data that is generated by a processor on the node of the service instance 520 ("service instance node"), an attestation that is generated by another application that is provided by the processor providing service instance node (e.g., another application in a secure enclave that is provided by the same processor that is providing the service instance node), or a software state associated with the service instance node. For example, the attestation data may be based on a cryptographic key of another application provided on the service instance node which is subsequently combined with a function of the processor providing the service instance node to generate the attestation data.

The secure service mesh manager 530 may receive the message 501 and may transmit the message 501 as a message 502 to the local attestation service 541. In some embodiments, the local attestation service 541 may be another application that is assigned to a secure enclave provided by a processor (e.g., an application 640A to 640Z of FIG. 6 that has been assigned to a secure enclave). The local attestation service 541 may verify the attestation data from the message 502. For example, another cryptographic key of the local attestation service 541 may be used to verify the attestation data. The local attestation service 541 may then initiate a remote attestation protocol by providing a message 503 to a cloud attestation service 542 which may also verify the attestation data and/or provide another message 504 to the attestation server 540. The cloud attestation service 542 may be another server that is associated with the secure service mesh manager 530. The attestation server 540 may then transmit a message 505 to cloud attestation service 542 (or the local attestation service 541 if the cloud attestation service 542 is not used). The message 505 may indicate whether the attestation data received by the attestation server 540 was generated and provided by a processor provided or manufactured by an entity associated with the attestation server 540. Subsequently, the local attestation service 541 may receive a message 506 from the cloud attestation service 542 that includes the indication from the attestation server 540. The local attestation service may then provide a message 507 back to the administrator 530 that indicates that the attestation of the service instance node (on which service instance 520 is located) was successful or was not successful. If the attestation of the service instance node was successful, then the secure service mesh manager 530 may provide a message 508 to the secure sidecar 510 to indicate that the secure sidecar 510 should perform proxying for the service instance 520 (e.g., by intercepting requests and responses, performing infrastructure operations, and forwarding the requests and responses to the service instance 520) as described in conjunction with FIG. 2.

In particular embodiments, a certificate authority may provide a digital certificate to the secure sidecar 510 and the service instance 520 to register the service instance node with the secure cluster. For example, the digital certificate may include a public key and an entity (e.g., a particular node) that is assigned to the public key. The certificate authority may provide a digital certificate to the secure sidecar 510 that includes the public key of the service instance node so that the secure sidecar 510 may authenticate a subsequent message signed by the corresponding private key of the service instance node. In particular embodiments, the certificate authority may provide the digital certificate to the service instance node to authenticate and register with the node on which the secure sidecar 510 is located.

Figure 6:
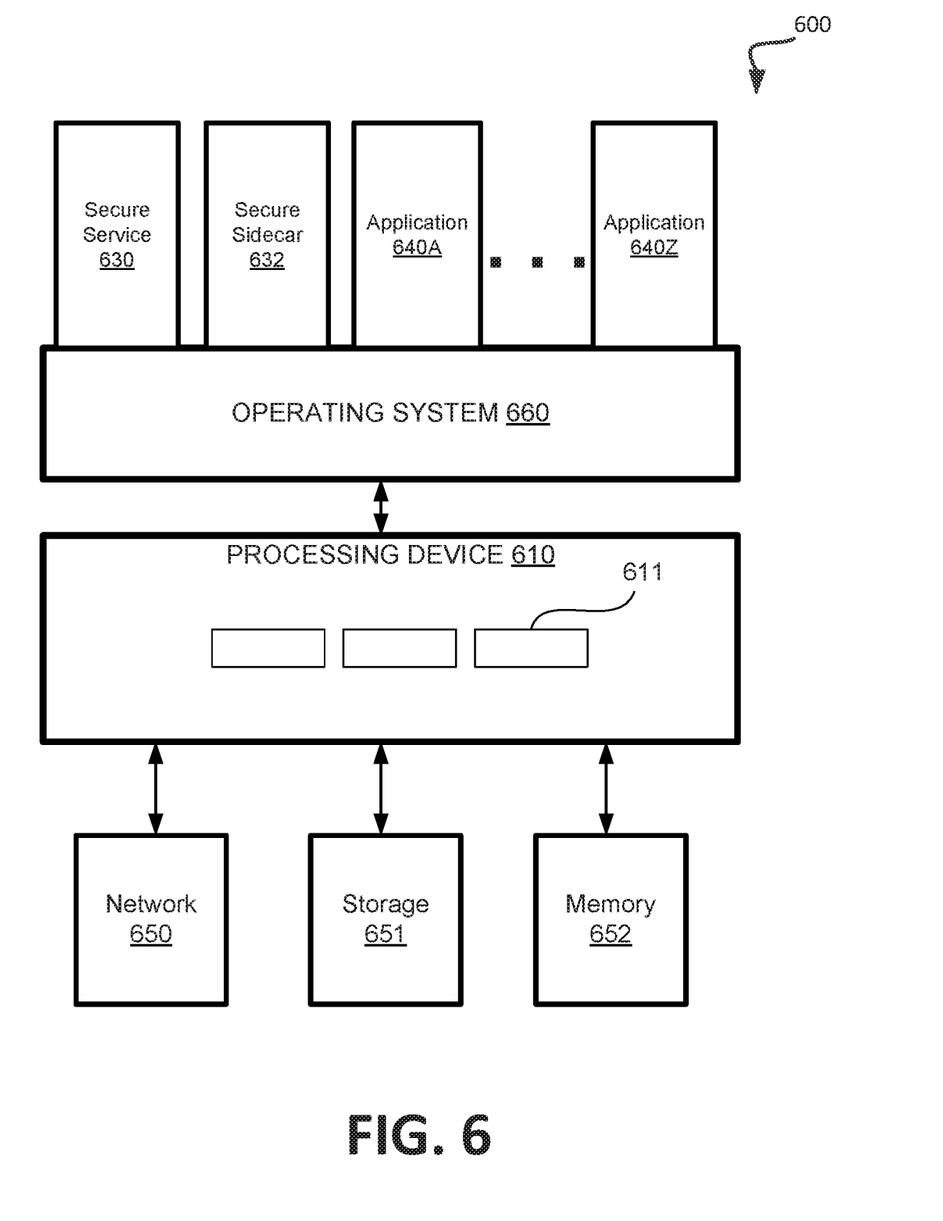
FIG. 6 illustrates an example network server with a secure service mesh environment to execute an application in accordance with particular embodiments of the present disclosure.

FIG. 6 illustrates an example network server 600 with a secure service mesh environment to execute an application in accordance with particular embodiments of the present disclosure. In general, a secure service 630 and a secure sidecar 632 may be hosted by a network server to provide secure service identity verification for one or more other applications 640A to 640Z that are also hosted by the network server or another network server. The secure service 630 may correspond to a node 110 or 130 of FIG. 1.

As shown in FIG. 6, the network server 600 may include a processing device 610 that may execute an operating system 620. Furthermore, the processing device 610 may include one or more internal cryptographic keys 611 that may be used to encrypt and decrypt data stored in a portion of a memory that is assigned to a secure enclave of the secure service 630. The access to the data of the secure service 630 in the secure enclave (e.g., data stored at a storage resource) may be protected from the one or more applications 640A to 640Z and the operating system 620. For example, the access to the data of the secure enclave corresponding to the secure service 630 may be protected by the use of one of the internal cryptographic keys 611 that are internal to the processing device 610 so that the access to the data is based on a hardware access as opposed to a software access. The operating system 620 may be associated with a first privilege level and the secure service 630 and the applications 640A to 640Z may be associated with a second privilege level where the first privilege level of the operating system is more privileged than the second privilege level of the various applications that are run on the operating system 620 (e.g., the more privileged level allows access to more resources of the network server than the less privileged level). Thus, the operating system 620 may be allowed access to resources of the applications 640A to 640Z. However, since the secure service 630 is assigned to a secure enclave where access to the data of the secure enclave is based on the use of an internal cryptographic key 611 of the processing device 611, the operating system 620 may not be able to access the data of the secure service 630 despite having a more privileged level of access than the secure service 630. The master key that is used to decrypt data at the storage resource may be an internal cryptographic key 611.

The above description may also apply to the secure sidecar 632, which may also use the same secure enclave as the secure service 630 or a different secure enclave. If the secure sidecar 632 and secure service 630 are in different secure enclaves, then communication between the two (e.g., to send requests and responses proxied by the secure sidecar 632) may be send via secure inter-enclave communication provided by the processing device 610.

Figure 7:
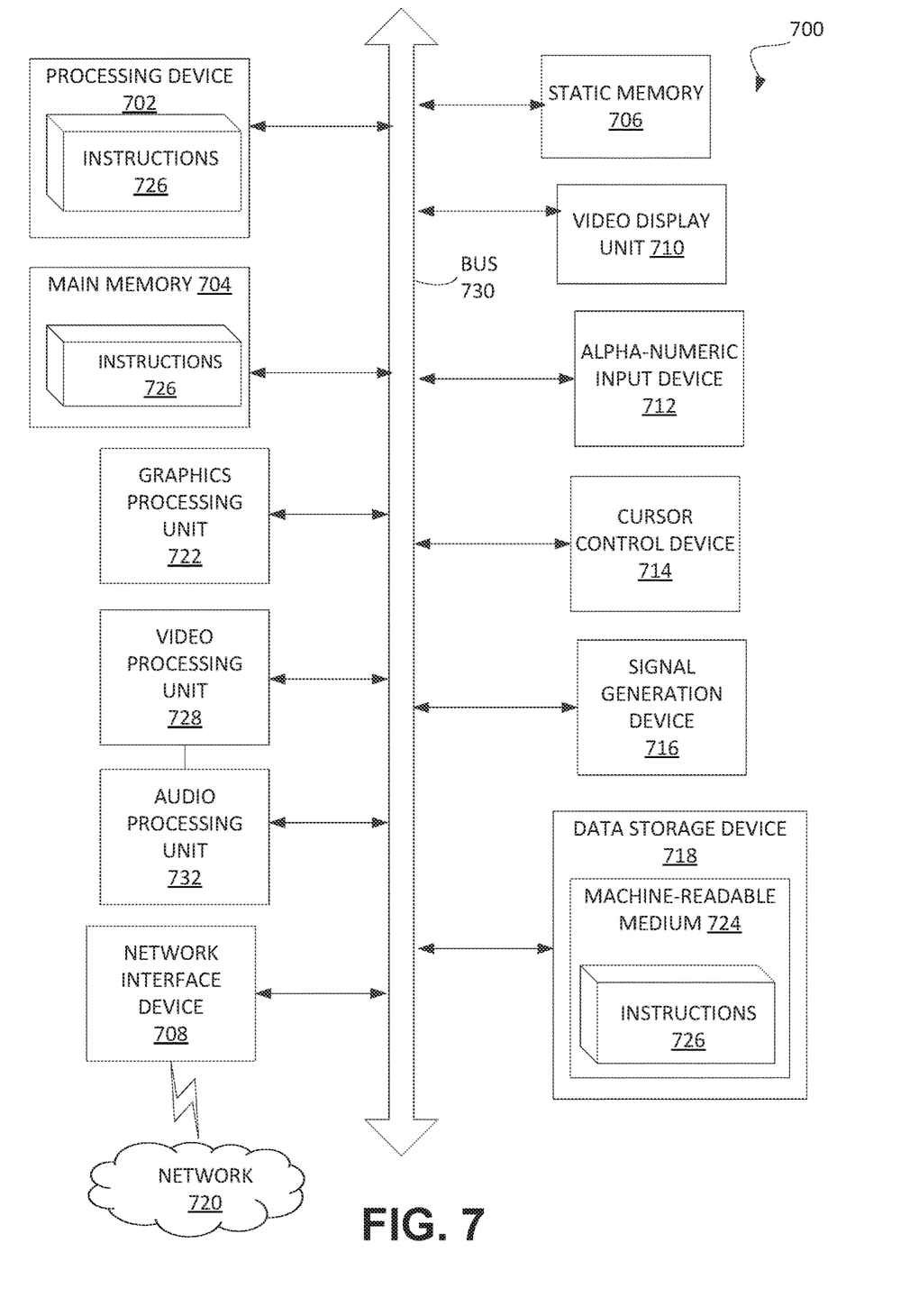
FIG. 7 illustrates an example computer system in which embodiments of the present disclosure operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality as described herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing certain terms may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving, by a processing device, a request to perform an operation associated with a service instance having an associated service instance identifier;
   identifying, by the processing device, a proxy instance associated with the service instance, wherein the proxy instance performs operations within a secure enclave associated with the processing device;
   verifying, using the proxy instance within the secure enclave associated with the processing device, that the secure enclave associated with the processing device contains the service instance associated with the service instance identifier; and
   sending, using the proxy instance within the secure enclave associated with the processing device, a request to the service instance to perform the operation.

2. The method of claim 1, wherein the verifying, using the proxy instance within the secure enclave, that the secure enclave contains the service instance associated with the service instance identifier comprises performing a local attestation protocol for the secure enclave, wherein the local attestation protocol verifies that the secure enclave contains code and data of the service instance.

3. The method of claim 1, further comprising:
   sending, by the processing device to a remote verification service, an association between the service instance identifier and a processor identifier that corresponds to the processing device, wherein the association is to be stored in a set of service identity associations.

4. The method of claim 3, wherein the verifying, using the proxy instance within the secure enclave, that the secure enclave contains the service instance associated with the service instance identifier comprises:
   verifying, using the proxy instance within the secure enclave to communicate with a remote attestation service via a remote attestation protocol, an identity of the processing device; and
   verifying, using the proxy instance within the secure enclave to communicate with the remote verification service via a secure communication protocol, that the service instance identifier is associated with a processor identifier that corresponds to the processing device.

5. The method of claim 4, wherein the verifying that the service instance identifier is associated with a processor identifier that corresponds to the processing device comprises sending a request to a remote verification service via the secure communication protocol to determine whether the service instance identifier is associated with the processor identifier in accordance with a set of service identity associations.

6. The method of claim 5, wherein the secure communication protocol comprises at least one of a Transport Layer Security (TLS) protocol or a Secure Sockets Layer (SSL) protocol.

7. The method of claim 4, wherein the remote attestation protocol generates at least one encryption key, and the verifying that the service instance identifier is associated with a processor identifier that corresponds to the processing device comprises:
   encrypting the service instance identifier and the processor identifier using the encryption key;
   sending the encrypted service instance identifier and the encrypted processor identifier to a remote verification service; and
   receiving a response from the remote verification service indicating whether the service instance identifier is legitimately associated with the processor identifier in accordance with a set of service identity associations.

8. The method of claim 1, wherein the proxy instance comprises a secure sidecar configured to receive one or more first requests sent to the service instance by one or more senders, perform one or more infrastructure operations based on the first requests, and send one or more second requests based on the first requests to the service instance.

9. The method of claim 1, wherein the request to perform an operation associated with a service instance comprises a request to create the service instance based on the service instance identifier.

10. The method of claim 1, further comprising:
    loading, by the processing device, a service enclave image into the secure enclave, wherein the service enclave image includes code and data that implement the service instance and further includes the service instance identifier.

11. The method of claim 1, wherein the secure enclave comprises a region of a memory that is encrypted based on an encryption key that is internal to the processing device.

12. A system comprising:
    a memory; and
    a processing device, operatively coupled with the memory, to:
      receive a request to perform an operation associated with a service instance having an associated service instance identifier;
      identify a proxy instance associated with the service instance, wherein the proxy instance performs operations within a secure enclave associated with the processing device;
      verify, using the proxy instance within the secure enclave associated with the processing device, that the secure enclave associated with the processing device contains the service instance associated with the service instance identifier; and
      send, using the proxy instance within the secure enclave associated with the processing device, a request to the service instance to perform the operation.

13. The system of claim 12, wherein to verify, using the proxy instance within the secure enclave, that the secure enclave contains the service instance associated with the service instance identifier, the processing device is further to:
    perform a local attestation protocol for the secure enclave, wherein the local attestation protocol verifies that the secure enclave contains code and data of the service instance.

14. The system of claim 12, wherein the processing device is further to:
    send, to a remote verification service, an association between the service instance identifier and a processor identifier that corresponds to the processing device, wherein the association is to be stored in a set of service identity associations.

15. The system of claim 14, wherein to verify, using the proxy instance within the secure enclave, that the secure enclave contains the service instance associated with the service instance identifier, the processing device is further to:
- verify, using the proxy instance within the secure enclave to communicate with a remote attestation service via a remote attestation protocol, an identity of the processing device; and
- verify, using the proxy instance within the secure enclave to communicate with the remote verification service via a secure communication protocol, that the service instance identifier is associated with a processor identifier that corresponds to the processing device.

16. The system of claim 15, wherein to verify that the service instance identifier is associated with a processor identifier that corresponds to the processing device, the processing device is further to:
- sending a request to a remote verification service via the secure communication protocol to determine whether the service instance identifier is associated with the processor identifier in accordance with a set of service identity associations.

17. A non-transitory computer readable medium comprising data that, when accessed by a processing device, cause the processing device to perform operations comprising:
- receiving a request to perform an operation associated with a service instance having an associated service instance identifier;
- identifying a proxy instance associated with the service instance, wherein the proxy instance performs operations within a secure enclave associated with the processing device;
- verifying, using the proxy instance within the secure enclave associated with the processing device, that the secure enclave associated with the processing device contains the service instance associated with the service instance identifier; and
- sending, using the proxy instance within the secure enclave associated with the processing device, a request to the service instance to perform the operation.

18. The non-transitory computer readable medium of claim 17, wherein to verify, using the proxy instance within the secure enclave, that the secure enclave contains the service instance associated with the service instance identifier, the operations further comprise:
- performing a local attestation protocol for the secure enclave, wherein the local attestation protocol verifies that the secure enclave contains code and data of the service instance.

19. The non-transitory computer readable medium of claim 17, the operations further comprising:
- sending, to a remote verification service, an association between the service instance identifier and a processor identifier that corresponds to the processing device, wherein the association is to be stored in a set of service identity associations.

20. The non-transitory computer readable medium of claim 19, wherein to verify, using the proxy instance within the secure enclave, that the secure enclave contains the service instance associated with the service instance identifier, the operations further comprise:
- verifying, using the proxy instance within the secure enclave to communicate with a remote attestation service via a remote attestation protocol, an identity of the processing device; and
- verifying, using the proxy instance within the secure enclave to communicate with the remote verification service via a secure communication protocol, that the service instance identifier is associated with a processor identifier that corresponds to the processing device.

* * * * *